United States Patent [19]

Reiter

[11] Patent Number: 4,688,801

[45] Date of Patent: Aug. 25, 1987

[54] PRODUCTION OF HOMOGENEOUS MOLDED GOLF BALLS

[76] Inventor: Ralph H. Reiter, 194 Putting Green Rd., Trumbull, Conn. 06611

[21] Appl. No.: 778,945

[22] Filed: Sep. 23, 1985

[51] Int. Cl.[4] .................. A63B 37/02; A63B 37/06
[52] U.S. Cl. ............................ 273/218; 273/220; 273/235 R
[58] Field of Search ............... 273/218, 220, 230; 524/908, 34, 35, 37

[56] References Cited

U.S. PATENT DOCUMENTS

| | | | |
|---|---|---|---|
| 3,438,933 | 4/1969 | Bartsch | 273/218 |
| 3,478,132 | 11/1969 | Randolph | 273/220 |
| 3,791,655 | 2/1974 | Schweiker et al. | 273/218 |
| 3,974,238 | 8/1976 | Schweiker et al. | 273/218 |
| 4,056,269 | 11/1977 | Pollit et al. | 273/218 |
| 4,068,849 | 1/1978 | DiSalvo et al. | 273/218 |
| 4,165,877 | 8/1979 | Miller et al. | 273/218 |
| 4,169,599 | 10/1979 | Fujio et al. | 273/220 |
| 4,264,075 | 4/1981 | Miller et al. | 524/571 |
| 4,266,772 | 5/1981 | Martin et al. | 273/218 |
| 4,305,851 | 12/1981 | Tominaga et al. | 524/571 |

Primary Examiner—Allan M. Lieberman
Attorney, Agent, or Firm—M. S. Jarosz; R. L. Taylor

[57] ABSTRACT

Homogeneous molded one and two-piece golf balls exhibiting, improved compression and fracture strength while maintaining desired rebound, click and feel required in a golf ball, are disclosed. The core of the golf ball is obtained by curing a composition comprising: (a) 100 parts by weight, of a polybutadiene elastomer containing at least 40% cis-1, 4-unsaturation; (b) from about 10 to about 50 parts, by weight, of a coagent comprising (i) an admixture or a reaction product of a polyvalent metal salt of an unsaturated carboxylic acid and an active hydrogen-containing organic filler or (ii) a reaction product obtained by the reaction of unsaturated carboxylic acid with an active hydrogen-containing organic filler, followed by further reaction with a polyvalent metal compound in the presence of said unsaturated carboxylic acid whereby said coagent functions as a crosslinking agent with the polybutadiene elastomer; (c) from about 10 to 30 parts, by weight, of an inert particulate mineral filler; and (d) from about 0.5 to 10 parts, by weight, of a polymerization initiator.

16 Claims, No Drawings

PRODUCTION OF HOMOGENEOUS MOLDED GOLF BALLS

BACKGROUND OF THE INVENTION (1) Field of the Invention

The present invention is directed to the production of hard, rubber, sport play balls, and particularly to one- and two-piece homogeneous golf balls, as well as to curable compositions from which such articles of manufacture are produced. More particularly, the present invention relates to the production of golf balls comprising a major proportion of cis-1,4- polybutadiene elastomer crosslinked with a coagent comprising (i) an admixture of a polyvalent metal salt of an unsaturated acid and an active hydrogen-containing organic filler, or (ii) a reaction product obtained by the reaction of an unsaturated carboxylic acid with an active hydrogen containing organic filler, followed by further reaction with a polyvalent metal compound in the presence of said unsaturated carboxylic acid whereby said coagent serves as a crosslinking agent with the polybutadiene elastomer. The incorporation of the coagent results in a golf ball exhibiting improved compression and fracture strength while maintaining desired rebound, click and feel required in a golf ball, as compared with golf balls produced from cis-1,4-polybutadiene elastomers devoid of the incorporation of the coagent of the invention.

(2) Description of the Prior Art

The technical evolution of the contemporary solid elastomer two-piece golf ball, as opposed to the ballata covered rubber thread wound balls (three-piece balls) has progressed to the stage where the average golfer may achieve satisfactory play with the two-piece homogeneous solid ball, but as a result of lack of durability, dependability and feel, i.e. click, of the ball, the professional or more astute golfer cannot rely upon the performance of the state of the art two-piece ball for serious or tournament play. The one-piece ball, although much described in the literature, is in reality not a practical item of commerce, simply because the compositions employed in formulation of the one-piece ball provide no greater degree of impact durability than do the compositions described to be respresentative of a core formulation for two-piece balls. The latter, however, circumvent the lack of impact resistance by encasing the core in a safety shell of high impact resistant polymers of various descriptions, most frequently described as "ionomer copolymers" manufactured and sold by E. I. Dupont de Nemours & Co. Inc., as "Surlyn TM". In general, the prior art, illustratively, U.S. Pat. Nos. 3,313,545; 3,438,933; 4,056,269; and 4,169,599, disclose the production of homogeneous golf balls by molding a composition comprising an elastomer, a crosslinking monomer and filler. According to these patent disclosures, the filler is distributed throughout the structure and serves a variety of functions, for example, improving the tensile and compression strength as well as adjusting the density to the USGA specified value for golf balls.

Golf balls manufactured as one-piece or two-piece balls based on the aforedescribed prior art compositions all develop a common problem. Upon aging, i.e. storage following their manufacture, these compositions continue to harden and consequently embrittle. After the composition has achieved a sufficiently high state of embrittlement upon impaction, as would be received from the head of the golf club, a fissure is developed, which upon a second or subsequent impact, results in one or more splits in the core or ball. When the two-piece ball is involved, the cracked aggregates in the encasement will shift on further impacts, resulting in the displacement of the center of gravity of a flying golf ball, and thus causing its flight to be totally unpredictable. The one-piece ball scenario is much simpler; if a fissure results, subsequent club hit impacts will cause the ball to crack into at least two pieces, thereby either destroying the ball or rendering the same unsuitable for continued play.

Hence, while such balls as described in the prior art have been generally satisfactory, it is an object of the present invention to improve the properties of such molded homogeneous balls still further with respect to compression and fracture strength, particularly upon aging, while maintaining desired rebound, flight characteristics, distance, cut and chip resistance, click and feel, required in a golf ball.

SUMMARY OF THE INVENTION

The present invention provides one- and two-piece solid homogeneous golf balls devoid of the aforedescribed drawbacks of conventional solid, rubber molded golf balls. The advantages realized in accordance with the present invention reside in employment of a coagent comprising: (i) an admixture of a polyvalent metal salt of an unsaturated acid and an active hydrogen-containing organic filler, or (ii) a reaction product obtained by the reaction of an unstaurated carboxylic acid with an active hydrogen containing organic filler, followed by further reaction with a polyvalent metal compound in the presence of said unsaturated carboxylic acid whereby said coagent functions as a crosslinking agent with the polybutadience elastomer. When cured under heat and pressure, preferably in the presence of a polymerization initiator, the novel compositions of the invention yield structures consisting of elastomer crosslinked into a three dimensional network incorporating metallic ions and active-hydrogen reactive sites provided by the organic filler and polyvalent metal salt of the coagent.

The curable compositions of the invention, in general, comprise:

(A) 100 parts, by weight, of a polybutadiene elastomer containing at least 40% of cis-1,4-unsaturation;

(B) from about 10 to 50 parts, by weight, of a coagent selected from the group consisting essentially of an admixture of a polyvalent metal salt of an unsaturated acid and an active hydrogen-containing organic filler, and a reaction product obtained by the reaction of an unsaturated carboxylic acid with an active hydrogen containing organic filler, followed by further reaction with a polyvalent metal compound in the presence of said unsaturated carboxylic acid, whereby said coagent functions as a crosslinking agent with the polybutadiene elastomer;

(C) from about 10 to 30 parts, by weight, of an inert particulate filler; and (D) from about 0.5 to 10 parts, by weight, of a polymerization initiator, which compositions are capable of providing, upon curing, a homogeneous molded ball, following conventional finishing operations, such as buffing, painting and the like. Alternatively, if a two-piece ball is desired, the cured composition may be encased as a core in a cover comprised of a metal salt of a copolymer of ethylene and unsaturated carboxylic acid and an inorganic filler. Hence, the present invention enables the production of stable, solid homogeneous one-piece golf balls, as well as two-piece golf balls capable of being encassed in thinner outer shell covers then conventionally employed; improved dispersibility of reactants in the elastomer, thereby shortening compounding (mixing) cycles in the production of articles of manufacture from the curable compositions of the invention; and the employment of reduced quantities of polyvalent metal salts which are in excess of the amount required to co-polymerize with the polybutadiene rubber and which normally results in undesirable homopolymerization of the polyvalent metal salts.

Accordingly, the present invention provides curable polybutadiene elastomer compositions which may be beneficially applied to the manufacture of one- and two-piece golf balls of superior performance, dependability, compression, click and durability, as well as one-piece balls which maintain their integral structure upon repeated impacts, even after aging. The unique feature of the present invention which provides for these superior golf ball characteristics resides in the employment of a coagent capable of functioning as a crosslinking agent with the polybutadiene elastomer comprising an admixture of a polyvalent metal salt of an unsaturated acid and an active hydrogen-containing organic filler, or a reaction product obtained by the reaction of an unsaturated carboxylic acid with an active hydrogen containing organic filler, followed by further reaction with a polyvalent metal compound in the presence of said unsaturated carboxylic acid. The use of the coagent described permits the metal ions of the polyvalent compound employed and the active hydrogen-containing organic filler to be crosslinked throughout the elastomer matrix thereby providing for unusually high resistance to deformation i.e., dimensional rigidity, and a high degree of cohesive strenght. These intrinsic properties translate into golf balls with high compression resistance, excellent initial velocity, integral cohesivity and durability, as well as more pleasing feel and click when hit off a golf tee. Other sport play balls, such as bowling and billiard balls, are also capable of being produced from the durable compositions of the invention, thereby providing improved dimensional rigidity and high degree of cohesive strength to such balls.

In the case of one-piece golf balls, the prior art has not successfully provided a ball which affords all the properties desired for a two-piece ball; furthermore, such prior art balls are produced from unstable compositions, which continue to react during storage. Golf balls manufactured in accordance with conventional practice of these prior disclosures have invariably resulted in compositions which, upon aging for two to three months, embrittle to such an extent that a single golf club head impact could crack and split the one-piece ball into several projectiles. Many theories regarding the embrittlement of these state of the are two-piece golf ball compositions have been offered but have not contributed to the resolution of the problem. In the course of discovering the compositions of the present invention, it has been learned that curing profiles of typical curable compositions based upon polybutadiene elastomer crosslinked with a typical polyvalent metal salt, e.g. zinc dimethacrylate or zinc diacrylate, indicated that at levels of 25 to 40 parts of such salts, per 100 parts of elastomer, the modulus of the compositions does not plateau within the normal cure time periods when compression molded at conventional temperatures. This indicates that the hard rubber mass had not fully cured and it was assumed that the polyvalent metal salt crosslinker, had not uniformly copolymerized with the unsaturation of the elastomer, but most probably, had homopolymerized to a significant extent. These centers of homopolymer were also suspected as not being totally reacted, and upon aging, would continue to homopolymerize to form very brittle, hard centers dispersed throughout the ball matrix which finally would act as points of fracture origin, when impacted.

Golf ball compositions of the present invention are, in contradistinction, characterized by markedly greater resistance to impact fracture and are chemically stable, even after aging, as result of the crosslinking achieved by use of the coagent which coreacts with the elastomer compositional matrix. This is noted when comparative rheographs are taken of the state of the art compositions and compared to the compositions of the present invention. These compositions, when molded for fifteen to thirty minutes, form hard rubber compositions which have a very high tensile modulus and reach a maximum value within ten minutes of pressing at temperatures of 320° F. to 350° F. The high modulus further remains stable, i.e. constant, when subjected to these molding conditions for thirty minutes after reaching its maximum torque, as measured with a rheometer. Moreover, samples of golf balls molded from compositions of the present invention retain their compression properties, as measured with a USGA golf ball compression tester, upon aging in a forced air oven at 150° F. for thirty days, whereas state of the art balls gain in compression under these conditions and also embrittle as observed by loss in fracture strength, i.e. compressive yield strength.

DESCRIPTION OF THE PREFERRED EMBODIMENTS

The curable compositions suitable for use in the production of the play balls of the invention, including the one-piece ball or the core of the two-piece golf ball, comprise an admixture of:

(a) 100 parts, by weight of the composition, of a polybutadiene elastomer;

(b) of from about 10 to 50 parts, by weight of the composition, of a coagent comprising an admixture of a polyvalent metal salt of an unsaturated acid and an active hydrogen-containing organic filler, or the reaction product obtained by the reaction of an unsaturated carboxylic acid with an active hydrogen containing organic filler, followed by further reaction with a polyvalent metal compound in the presence of said unsaturated carboxylic acid, whereby said coagent functions as a crosslinking agent with the polybutadiene elastomer;

(c) of from about 10 to 30 parts, by weight of the composition of an inert particulate mineral filler; and (d) of from about 0.5 to 10 parts, by weight of the composition, of a polymerization initiator, such as an alkyl peroxide.

The elastomer employed in the formulation of the compositions of the present invention is cis-polybutadiene rubber containing at least 40% of 1,4-cis configuration, although polybutadiene containing at least 90% of cis-1,4 configuration is preferred.

The coagent may be included in the composition of the invention as a physical admixture of a polyvalent metal salt of an unsaturated acid and an active hydrogen-containing organic filler or the reaction product obtained at the cure reaction conditions employed, of such salt with the active hydrogen-containing organic filler, or alternatively as the reaction product obtained by the reaction of an unsaturated carboxylic acid with an active hydrogen containing organic filler, followed by further reaction with a polyvalent metal compound in the presence of said unsaturated carboxylic acid.

When present as an admixture, the polyvalent metal salt is generally present in an amount of between about 5:1 to 1:5, preferably 2:1 to 1:2, based on the weight of the active hydrogen-containing filler. In the event the coagent is included in the form of the aforespecified reaction product, the reaction product coagent is conveniently prepared by reacting a suitable quantity of one or more of an active-hydrogen containing organic filler with at least one mixture of the below described salt-forming unsaturated acids, such as acrylic, methacrylic or itaconic acid, in a solvent which is capable of being azeotroped with water, thereby forming first an unsaturated ester derivative of the active hydrogen-containing organic filler, followed by further reaction of said ester derivative with a polyvalent metal compound in the presence of said unsaturated acid. In general, the weight ratios of unsaturated acid to organic filler are not critical, and in practice may range from about 4:1 to about 1:4, and preferably from 2:1 to 1:2 and sufficient excess quantities are normally employed for reaction to the ester derivative.

The polyvalent metal salt of unsaturated acid employable as a component of the coagent is generally soluble in the elastomer base, or readily dispersable under the normal conditions of elastomer compounding, or may be formed in situ as a component of the coagent from at least one intermediate of the polyvalent metal salt which is soluble in the elastomer base. In general, any polyvalent metal may be employed as a constituent of the polyvalent metal salt. Illustrative preferred polyvalent metals of the polyvalent metal salt are the divalent metals zinc, magnesium and calcium; the trivalent metal aluminum; and the tetravalent metals tin and titanium. Other examples of suitable metals include cadmium, lead, barium, zirconium, copper, iron, antimony and bismuth.

A further characteristic of the polyvalent metal salt of unsaturated acid employable as a component in the formation of the coagent of the invention is that it be copolymerizable with the elastomer and metal-free and metal containing polymerizable monomers conventionally employed in this art as are more particularly set forth below. Mixtures of different metal-containing salts of unsaturated acids are also within the scope of the present invention, provided that at least one member of the admixture be copolymerizable, as indicated. Illustrative examples of polymerizable salt-forming acids which are useful in the present invention include acrylic, methacrylic, crotonic, vinylacetic, itaconic, acotinic, styrenesulfonic, and benzoylacrylic acids, which form a preferred group. Other suitable polymerizable salt-forming acids include ethacrylic, alpha-chloroacrylic, 2-ethyl-3-propylacrylic, 2-allyloxypropionic, sorbic, maleic, chloromaleic, and beta,beta-dimethacrylic. Also included are salts of carboxylic polymers which have been at least partially prepolymerized before compounding or after compounding or processing, but prior to curing. Illustrative salts of carboxylic polymers include butadiene-acrylonitrile-acrylic acid, styrene-butadiene sorbic acid, butadiene-vinylacrylic acid, styrene-meleic anhydroxides, half esters polymers, and the like provided that these salts of carboxylic polymers contain residual polymerizable unsaturation.

The active hydrogen-containing organic filler employed for admixture with or reaction with the polyvalent metal salt of unsaturated acid in formulation of the coagent employed in the compositions of the invention may comprise any of the natural occurring, or synthetically produced active-hydrogen-containing, materials which conventionally are employed as fillers, in particulate or fibrous form. Illustrative example of active hydrogen-containing groups include hydroxyl, sulfhydryl, amino, amido, carboxyl, sulfoxyl and carbamoyl. A particularly preferred class of active hydrogen-containing organic filler employable comprises discontinous cellulose fiber. Cellulose, being a carbohydrate polymer of glucose residue units, includes both regenerated and unregenerated or natural cellulose. Rayon, for example, is regenerated cellulose. Examples of natural cellulose fibers include: seed fibers represented by cotton; woody fibers represented by coniferous and deciduous woods; bast fibers represented by flax; leaf fibers represented by sisal; fruit fibers represented by cocoanut; as well as discontinous cellulose fiber obtained from Kraft wrapping paper, used newsprint, softwood sulfite and the like. Also employable as hydroxyl-containing organic filler materials in formation of the coagent employable in the present invention are other organic polymers in their particulate forms. Illustrative organic polymers employable herein for such purpose include: polyamide (nylon 6 or nylon 66), polyvinyl alcohol and copolyers thereof with vinyl acetate, polyvinyl butyral, carboxyethyl cellulose, hydroxyalkyl cellulose, thiolene polymers, phenol-formaldehye resins, melamine-formaldehye resins, quanamine-formaldehye resins, urea-formaldehye resins, epoxy resins, bis phenol exoxy resins, acrylic and methacrylic copolymers containing carboxylic functionialty, styrenemaleic partial esters and the like. The solvent is employed in a quantity sufficient to serve as carrier for the organic filler and to remove water of reaction and absorbed moisture, azeotropically for example, water which may be present on the filler. Thereafter, the reaction mixture is heated at an elevated temperature, preferably at reflux temperatures until the water of reaction ceases to evolve. The resulting reaction product containing the partially esterified derivative of said organic filler is cooled, and a polyvalent metal compound, for example, in the form of an oxide, hydroxide or carbonate, capable of forming a polyvalent metal salt with the unsaturated acid is added to the reactor and the resulting mixture is heated at an elevated temperature, preferably at reflux temperatures, until water of reaction ceases to be evolved. In general, the weight ratios of organic filler to unsaturated carboxylic acid to polyvalent metal compound employed in this in situ method of preparation may range from about 4:1:0.5 to about 0.5:1:4, and preferably, from 2:1:0.8 to 0.8:1:2, respectively. Thereafter, the reaction mass is cooled and discharged through a filter. Following discharge, the collected solid is dried at an elevated temperature and reduced pressure, typically at a temperature of between about 60° C. and 90° C. and 20 to 40 mm Hg, to obtain a reaction product containing less than 2.5% and preferably, less than 1% volatiles. The reaction product is in condition for dispersion in the elastomer in accordance with conventual procedures. An admixture of partially acrylated cellulose, acrylic acid celluose and zinc diacrylate comprise a typical product obtainable by such procedure, when cellulose is employed as the active hydrogen-containing organic filler, acrylic acid is employed as the unsaturated acid, and zinc oxide is employed as the polyvalent metal compound in such reaction.

It is believed that the cured composition of the invention is held together as a cohesive mass by ionomeric crosslinking created by the interaction of the active hydrogen-containing organic filler, the polyvalent metal salt and the unsaturation of the polybutadiene elastomer. It is conjectured that the improved compression and fracture strength, characteristic of the golf balls of the present invention is attributable to such ionic crosslinking. This type of crosslinking provides distinct advantages over golf balls produced by conventional crosslinking of a polymer with a monomer as disclosed, for example, in the aforementioned U.S. Pat. Nos. 3,313,545; 3,438,933 and 4,056,269.

In formulation of the golf balls of the invention, it is required that an inert particulate mineral filler be incorporated into the formulation so that the finished ball will have the desired density of a standard U.S.G.A. approved ball. In general, the amount of inert particulate mineral filler employed may range from about 10 to about 30 parts, by weight, of the total composition. Any conventional particulate mineral filler which is inert to the reactant components of the composition may be used. Such filler is generally present in finely divided form, as for example, less than about 20 mesh, and preferably less than about 100 mesh U.S. standard screen size. Suitable fillers include silica, silicates, sulfates such as barytes and calcium sulfate, zinc oxide, carbon black, titania, alumina fibers, asbestos, talc and metal oxides and carbonates. Employment of the oxide, hydroxide or carbonate of the same polyvalent metal which is present as a component of the coagent is particularly convenient. In addition, impact modifiers as are conventionally known in the art, such as ultra-high molecular weight polyethylene and acrylonitrile-butadiene-styrene resin, may be optionally included in the composition of the invention in minor amount, i.e. up to about 10% by weight of the composition.

A polymerization initiator is also included as a component of the curable composition of the invention. Any initiator which decomposes to produce free radicals during the cure cycle, as is known in the art, may be employed, and is present in catalytic amount required for this function, generally in amounts of between about 0.5 to 10 parts, by weight of the composition. Suitable initiators include peroxides, persulfates, azo compounds, ionizing radiation, and the like. Alkyl peroxides such as dicumyl peroxide, 1,1-di-t-butylperoxy-3,3, 5trimethylcyclohexane, di-t-butyl peroxide and 2,5-bis (t-butylperoxy)2,5-dimethylhexane are commercially available and conveniently employable in amounts of between about 0.5 to 10 parts, by weight of the composition.

Optionally, if desired, a saturated aliphatic carboxylic acid, or mixtures thereof, containing of from 8 to 20 carbon atoms, as well as their zinc salts, may be incorporated in the compositions of the present invention to aid in the dispersion of the coagent into the elastomer matrix. Illustrative saturated aliphatic carboxylic acids employable for this purpose include stearic, palmitic, myristic, octanoic, decanoic, lauric, eicosanoic and capric. If employed, the saturated aliphatic carboxylic acid is generally present in an amount of between about 0.05 to 10 parts, per 100 parts of polybutadiene elastomer. As a result of improved dispersion of the coagent, it has been found that inclusion of such carboxylic acids or salts thereof, as indicated, may increase the PGA compression by 5% to 25%, without sacrificing fracture strength, rebound, or other desired physical properties of the golf ball.

Metal-free and metal containing polymerizable monomers, such as esters of unsaturated acids, or polyvalent metal salts, may also be incorporated in the composition of the present invention in order to achieve special effects in formulation of one-piece golf balls, or golf ball cores for two-piece balls. Illustrative metal-free polymerizable monomers include allyl, methallyl, vinyl, furfuryl, crotyl, and cinnamyl esters of monobasic and polybasic acids such as acetic, propionic, butyric, pivalic, benzoic, phenylacetic, chloroacetic, oxalic, malonic, succinic, adipic, maleic, itaconic, fumaric, citric, phthalic, isophthalic, terephthalic, napthalenedicarboxylic, acrylic, methacrylic, and cyanuric. Also included in this class are polyol and alkoxylated (e.g. ethylene oxide and propylene oxide) polyol esters and anhydrides of unsaturated carboxylic acids such as acrylic, methacrylic, and halogenated derivatives thereof, and the said polyols include ethylene glycol, di-tri-and tetraethylene glycol, propylene glycol, glycerol, 1,4-butylene glycol, trimethylolpropane, pentaerythritol, and the like. Illustrative examples of such metal-containing and metal-free polymerizable monomers include trimethylolpropane triacylate, pentaerythritol tetracrylate, dipentaerythritol pentacrylate, ditrimethylolpropane tetracrylate, trimethylolpropane trimethacrylate, pentaerythritol tetramethacrylate, zinc dimethacrylate and zinc monomethacrylate.

Other adjuvants conventionally employed in formulation of polybutadiene elastomer curing compositions, such as antioxidants, and accelerators, and the like, may also be included in the composition of the invention in minor amounts, i.e. up to about 5% and colorants up to about 10%, based on the weight of the composition.

In the production of articles of manufacture from the curable compositions of the invention, for example golf balls, the reactant ingredients are normally intimately admixed using, for example, conventional rubber mixing rolls or a Banbury mixer until the composition is uniform. The temperature of the mixing operation is not critical, but should be below temperatures at which the curing reaction commences, i.e., below the ten hour half-life decomposition temperature for the initiator employed. In general, normal rubber milling practice is employed.

The molding of the curable composition is effected in conventional manner in precision hemisphere dies having molding surface capable of providing a dimpled or waffled molded ball surface appearance to optimize aero-dynamic characteristics by transfer, compression or injection molding techniques. The molding temperature may vary depending on the ingredients of the particular composition used, and may, for example, range from between about 125° C. and 200° C. Curing times, in general, range from about 5 to 60 minutes, and preferably from about 10 to 30 minutes.

Following molding, the balls are removed from the mold and the ball is painted and marked, in the case of a one-piece ball and is then ready for use. Painting is effected in conventional manner, using, for example, enamel, polyurethane, epoxy, acrylic or vinyl paints.

In the case of production of a two-piece ball, the spherical homogeneous core obtained from curing of the curable composition of the invention is encased within preformed hollow shells and the resulting assembly is pressmolded, generally at temperatures above 100° C. in the mold. Another method employed, involves enclosing the core in a cover by injection molding, in accordance with conventional practice. The composition of the cover of a two-piece ball, in accordance with the present invention, comprises an admixture containing 100 parts, by weight of the cover, of a metal salt of a copolymer of ethylene and an unsaturated carboxylic acid, and generally up to about 10 parts, by weight, of an inorganic filler. The unsaturated carboxylic acid employed normally comprises a metal salt of the copolymer of ethylene and an unsaturated carboxylic acid, for example, acrylic acid, methacrylic acid, itaconic acid, crotonic acid, sorbic acid and the like. Illustrative examples of the metal to be used in the formation of the metal salt includes sodium, zinc and the like. Neither the proportions of ethylene to unsaturated carboxylic acid, nor the nature of the metal salt are critical to this invention; such compositions are generally described in U.S. Pat. No. 3,454,676, the disclosure of which is hereby incorporated by reference. The cover preferably contains of from between about 0.5% and 5%, by weight of the cover, of an inorganic filler to provide a white appearance to the ball. Any filler conventionally employed in formation of such covers including silica, calcium carbonate, zinc oxide, titanium dioxide and the like, are suitable for production of the two-piece balls of the invention.

In order to exemplify the compositions of the present invention, a number of golf ball specimens were prepared and their properties evaluated as indicated below. The examples are given for the purpose of illustration of the invention, solely, and are not intended as limitations thereof. In the examples, parts referred to are parts by weight of the composition. In these examples, the properties of the golf balls are measured in a variety of tests.

"PGA Compression" is obtained employing an Atti Engineering Corporation golf ball compression tester. The value obtained by this test relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The test apparatus consists of a lower movable platform and an upper movable springloaded handle. The dial indicator is mounted such that it measures the upward movement of the springloaded handle. The golf ball to be tested is placed in the lower platform, which is then raised a fixed distance. The upper portion of the golf ball comes in contact with and exerts a pressure on the springloaded handle. Depending upon the distance of the golf ball to be compressed, the upper handle is forced upward against the spring.

The "Ball Click Test" is an audible sound test comparing the impact sound of the ball under test, with that produced by a commercial golf ball, (i.e. the impact sound considered acceptable by golf players).

"Rebound" is the height to which a ball will bounce, expressed as a percentage of the height from which it is dropped onto a hard, flat, horizontal surface, such as a thick marble slab. The ball with higher rebound is "livelier" in play and is thus more acceptable to astute or professional golfers.

"Fracture Load", expressed in metric tons, measures the fracture strength of a golf ball core by use of a commercially available Carver Press (Model C-laboratory press). In conducting this test, golf ball cores at room temperature are centered in the press with the seam parallel to the surface of the stage, the press is then closed until the core fractures as can be easily heard, and the fracture is recorded to the nearest 0.1 metric ton by taking an average value of all cores tested for each lot of compound.

EXAMPLES 1-8

A masterbatch of a golf ball compound was prepared by first banding 100 parts of a cis-polybutadiene elastomer and then blending with 7.5 parts of zinc oxide, 2.0 parts of commercially available accelerator, N,N'-metaphenylene dimaleimide, (HVA-2) and antioxidant, 2,2'-methylene-bis [4-methyl-6-t-butylphenol](Antioxidant 2246). The master batch was then removed from the mixing machine, allowed to cool, and 110 part aliquots of the masterbatch were combined at a temperature of between 150° and 220° F. with 25 parts of the active hydrogen-containing fibrous organic filler identified in Table I below, 37 parts of commercially available zinc diacrylate monomer, and 6 parts of Di-Cup 40KE, a commercial polymerization initiator containing 40%, by weight, of dicumul peroxide and 60%, by weight, of inert carrier.

Upon sheeting and cooling each compound to room temperature, 2 plugs from each compound were weighed to the nearest 0.1 grams at a weight of 47.5 grams. The plugs were placed into selected cavities of a pre-heated golf ball mold which had been conditioned at 320° F. The specimens were then pressed at 17 tons RAM pressure for 20 minutes, removed from the mold and cooled in cool water for 2 hours before testing. The results (average of balls from 2 plugs) obtained are set forth in Table I below.

TABLE I

| Composition No. | Organic Filler (Chemical Type) | PGA Compression (Atti) | Rebound % | Fracture Load (Metric Tons) | Ball Weight (gms) | Click |
|---|---|---|---|---|---|---|
| 1 | Nylon Flock (Nylon 6-6) | 125 | 76 | 3.65 | 45.5 | Extra Loud |
| 2 | Solka Flock BW-300 (Cellulose-Wood) | 116 | 75 | 2.40 | 45.8 | Loud |
| 3 | Cotton Flock #525 (Cellulose-Cotton) | 126 | 74 | 2.20 | 45.8 | Extra Loud |
| 4 | Avicel PH 101, (Microcystalline Cellulose) | 115 | 74 | 1.85 | 45.8 | Moderately Loud |
| 5 | Battery Cork Dust, (Suberin/Cellulose) | 110 | 75 | 2.20 | 45.7 | Moderately Loud |
| 6 | Natural Rayon | 123 | 75 | 1.60 | 45.8 | Loud |

TABLE I-continued

| Composition No. | Organic Filler (Chemical Type) | PGA Compression (Atti) | Rebound % | Fracture Load (Metric Tons) | Ball Weight (gms) | Click |
|---|---|---|---|---|---|---|
| | Floc 563 (Rayon) | | | | | |
| 7 | C-P 40 ALPHA-CEL (Cellulose) | 115 | 75 | 1.95 | 45.7 | Moderately Loud |
| 8 | Control - No Filler | 73 | 78 | 1.10 | 45.3 | Moderately Loud |

As is evident from results set forth in Table I above, all golf balls produced from compositions of the invention exhibited substantially higher compression values as compared with golf balls produced containing no filler. The results also indicate that golf balls prepared from the compositions of the invention retain desired rebound and fracture resistance and exhibit click required in a golf ball.

COMPARATIVE EXAMPLES 9-12

One-piece solid golf balls were produced under the same compounding recipe as described in Examples 1-8, except that an inorganic particulate inert filler, identified in Table II below, was employed in lieu of the active hydrogen containing organic filler. Properties of the golf balls produced from such compositions are set forth in following Table II.

TABLE II

| Composition No. | Organic Filler (Chemical Type) | PGA Compression (Atti) | Rebound % | Fracture Load (Metric Tons) | Ball Weight (gms) | Click |
|---|---|---|---|---|---|---|
| 9 | Franklin Fiber (Calcium Sulfate) | 90 | 74 | 1.2 | 46.7 | Loud |
| 10 | Barytes, 325 Mesh (Barium Sulfate, particulate) | 60 | 72 | 1.0 | 47.3 | Moderately Loud |
| 11 | Zinc oxide XX-4 (Zinc oxide, particulate) | 54 | 73 | 0.8 | 47.0 | Moderately Loud |
| 12 | Control - No Filler | 70 | 80 | 0.9 | 45.4 | Moderately Loud |

As is evident from the results set forth in Table II, golf balls resulting from the compositions containing an inorganic particulate filler fail to exhibit the PGA compression and fracture load characteristic of golf balls obtained from compositions of the present invention, employing a coagent comprising a polyvalent metal salt of a carboxylic acid and an active hydrogen-containing organic filler.

EXAMPLE 13-17

A masterbatch of rubber compound was prepared on a two roller mill by combining the following ingredients into a smooth, uniform sheet while maintaining the mill temperature below 175° F.:
    2000 parts Polybutadiene
    150 parts Zinc
    10 parts Antioxdant 2246
    120 parts Dicumy peroxide (DiCup 40KE)
    40 parts Acceleator HVA-2
    400 parts Zinc Dacrylate To 136 grams aliquots of the above masterbatch, rebanded on a cool two roller mill, are added each of the organic fillers at the specified levels indicated in Table III, below. Golf balls were molded for 30 minutes at 320° F. using a four cavity mold. The results obtained are set forth in Table III, below.

TABLE III

| Composition No. | Organic Filler (Chemical Type) | Parts | PGA Compression (Atti) | Fracture Load (Metric Tons) | Rebound % |
|---|---|---|---|---|---|
| 13 | Wood-Flock | 20 | 78.5 | 2.69 | 75 |
| 14 | Wood-Flock | 50 | 107.5 | 2.77 | 73 |
| 15 | Cotton-Flock | 20 | 128.7 | 2.95 | 74 |
| 16 | Cotton-Flock | 50 | 155.2 | 3.43 | 72 |
| 17 | Control | None | 36.0 | 1.00 | 78 |

As is evident from the results set forth in Table III, golf balls produced from the compositions of the invention exhibited substantially higher compression values and fracture resistance than golf balls produced from compositions devoid of active hydrogen containing organic fillers.

EXAMPLES 18-23

Golf ball compounds were prepared and molded into golf balls in accordance with the procedure of Examples 1-8, except that the compounds were modified by substituting or omitting the ingredients, where indicated, in Table IV, in place of the solka floc organic filler of Example 2 and the zinc diacrylate monomer. The results obtained are set forth in Table IV, below.

TABLE IV

| Composition No. | Composition Modification | PGA Composition (Atti) | Rebound % | Fracture Load (Metric Tons) |
|---|---|---|---|---|
| 18 | 20 parts solka floc 20 parts zinc diacrylate monomer | 79 | 76 | 1.95 (hard) |
| 19 | omitted solka floc | 61 | 79 | 1.06 (hard) |
| 20 | substituted zinc diproprionate for zinc diacrylate monomer omitted solka-floc | 0 | 80 | 6 (soft) |

TABLE IV-continued

| Composition No. | Composition Modification | PGA Composition (Atti) | Rebound % | Fracture Load (Metric Tons) |
|---|---|---|---|---|
| 21 | 20 parts solka floc filler, 20 parts zinc dipropionate | 0 | 72.5 | 76 (soft) |
| 22 | 20 parts solka floc filler omitted zinc diacrylate monomer | 0 | 82.5 | 0.1 (soft) |
| 23 | 20 parts zinc oxide omitted zinc diacrylate monomer | 0 | 84.3 | 0.1 (soft) |

The compounds of examples 18 and 19 afforded play balls which had loud, audible clicks when hit, and did not transmit a hard electrifying vibrational feel through the shaft of a No. 3 golfing iron.

The foregoing Examples illustrate, by virtue of the hardness of PGA compressions, that zinc diacrylate does indeed modify the physical strength and compression of the polybutadiene rubber, while the non-reactive zinc dipropionate does not. Moreover when an active hydrogen-containing organic filler is present, the coagent combination imparts properties which are totally unpredictable from the performance of either the organic filler alone or the zinc diacrylate crosslinker alone. This co-action results in a synergistic effect, created by the inter-reaction of the organic filler, the zinc diacrylate monomer and the unsaturated polybutadiene elastomer.

What is claimed is:

1. A homogeneous molded golf ball exhibiting improved compression and fracture strength while maintaining desired rebound, click, and feel required in a golf ball, obtained by curing a composition comprising:
   (A) 100 parts, by weight, of a polybutadiene elastomer containing at least 40% of cis-1,4-unsaturation;
   (B) from about 10 to 50 parts, by weight, of a coagent selected from the group consisting essentially of (i) an admixture of a polyvalent metal salt of an unsaturated acid and an active hydrogen-containing organic filler, and (ii) a reaction product obtained by the reaction of an unsaturated carboxylic acid with an active hydrogen containing organic filler, followed by further reaction with a polyvalent metal compound in the presence of said unsaturated carboxylic acid, whereby said coagent functions as a crosslinking agent with the polybutadiene elastomer said organic filler, unsaturated carboxylic acid and polyvalent metal compound are present in an amount, by weight, of about 4:1:0.5 to about 0.5:1:4, respectively;
   (C) from about 10 to 30 parts, by weight, of an inert particulate filler; and
   (D) from about 0.5 to 10 parts, by weight, of a polymerization initiator.

2. A two-piece golf ball according to claim 1 wherein said cured composition comprises a central core of the golf ball encased in an outer cover.

3. A golf ball according to claim 2 wherein said cover comprises an admixture of 100 parts, by weight of the cover, of a metal salt of a copolymer of ethylene and unsaturated carboxylic acid and from between about 0.5 and 10 parts, by weight, of the cover, of an inorganic filler.

4. A golf ball according to claim 1 or claim 3 wherein said polyvalent metal salt comprises a salt of at least one metal selected from the group consisting of zinc, magnesium, calcium and aluminum, and at least one unsaturated carboxylic acid selected from the group consisting of acrylic, methacrylic and itaconic acid, and said polymerization initiator is an alkyl peroxide.

5. A golf ball according to claim 4 wherein said polyvalent metal salt is zinc diacrylate.

6. A golf ball according to claim 5 wherein said organic filler is cellulose.

7. A golf ball according to claim 1 or claim 3 wherein said coagent comprises an admixture of a polyvalent metal salt of an unsaturated acid and an active hydrogen-containing filler.

8. A golf ball according to claim 7 wherein said polyvalent metal salt is present in an amount of between about 2:1 and 1:1 by weight, of the organic filler.

9. A golf ball according to claim 1 or claim 3 wherein said coagent comprises, a reaction product obtained by the reaction of an unsaturated carboxylic acid with an active hydrogen containg organic filler, followed by further reaction with a polyvalent metal compound in the presence of said unsaturated carboxylic acid.

10. A golf ball according to claim 9 wherein said coagent is obtained by reaction, in the presence of an unsaturated carboxylic acid, of a compound selected from the group consisting of an oxide, hydroxide and carbonate of a polyvalent metal selected from the group consisting of zinc, magnesium, calcium and aluminum, with an active hydrogen-containing organic filler which has been prereacted with at least one unsaturated carboxylic acid selected from the group consisting of acrylic, methacrylic and itaconic acid.

11. A golf ball according to claim 10 wherein such organic filler, unsaturated carboxylic acid and polyvalent metal compound are present in an amount, by weight, of 2:1:0.8 and 0.8:1:2, respectively.

12. A golf ball according to claim 11 wherein said coagent is obtained by reaction of zinc oxide with cellulose which has been prereacted with acrylic acid.

13. In the process for producing a homogeneous molded golf ball by curing an admixture of a polybutadiene elastomer, a crosslinkable monomer, a particulate mineral filler, and a free radical catalyst, the improvement which comprises employing as said crosslinkable monomer from between about 10 and 50 parts, by weight per 100 parts of said elastomer, of a coagent selected from the group consisting essentially of (i) an admixture of a polyvalent metal salt of an unsaturated carboxylic acid and an active hydrogen-containing organic filler, and (ii) a reaction product obtained by the reaction of an unsaturated carboxylic acid with an active hydrogen containing organic filler, followed by further reaction with a polyvalent metal compound in the presence of said unsaturated carboxylic acid, whereby said coagent functions as a crosslinking agent with the polybutadiene elastomer and wherein said organic filler, unsaturated carboxylic acid and polyvalent metal compound are present in an amount, by weight, of about 4:1:0.5 to about 0.5:1:4, respectively.

14. The process according to claim 13, wherein said coagent comprises an admixture of a polyvalent metal salt of an unsaturated carboxylic acid and an active hydrogen-containing organic filler.

15. The process according to claim 13, wherein said coagent is obtained by reaction, in the presence of an unsaturated carboxylic acid, of a compound selected from the group consisting of an oxide, hydroxide and carbonate of a polyvalent metal selected from the group consisting of zinc, magnesium, calcium and aluminum, with an active hydrogen-containing organic filler which has been prereacted with at least one unsaturated carboxylic acid selected from the group consisting of acrylic, methacrylic and itaconic acid.

16. The process according to claim 15, wherein said coagent is obtained by reaction of zinc oxide with cellulose which has been prereacted with acrylic acid.

* * * * *

UNITED STATES PATENT AND TRADEMARK OFFICE
CERTIFICATE OF CORRECTION

PATENT NO. : 4,688,801
DATED : August 25, 1987
INVENTOR(S) : Ralph H. Reiter

It is certified that error appears in the above-identified patent and that said Letters Patent is hereby corrected as shown below:

On the Title Page add Item [73]

[73] Assignee: PONY INDUSTRIES, INC.

Signed and Sealed this

Twenty-second Day of March, 1988

Attest:

DONALD J. QUIGG

*Attesting Officer*     *Commissioner of Patents and Trademarks*